(12) United States Patent
Mohsen et al.

(10) Patent No.: US 6,989,103 B2
(45) Date of Patent: Jan. 24, 2006

(54) METHOD FOR SEPARATING FLUIDS

(75) Inventors: Abdul Hameed Mohsen, Abu-Dhabi (AE); Mohammed Nashat, Al-Mutlaq Compound (SA); Mansour Shaheen, Cairo (EG); Alp Tengirsek, Lumpur (MY); Thomas Wilson, Tanager (NO)

(73) Assignee: Schlumberger Technology Corporation, Sugar Land, TX (US)

( * ) Notice: Subject to any disclaimer, the term of this patent is extended or adjusted under 35 U.S.C. 154(b) by 34 days.

(21) Appl. No.: 10/398,927

(22) PCT Filed: Oct. 10, 2001

(86) PCT No.: PCT/EP01/11712

§ 371 (c)(1),
(2), (4) Date: Jul. 7, 2003

(87) PCT Pub. No.: WO02/31309

PCT Pub. Date: Apr. 18, 2002

(65) Prior Publication Data

US 2003/0217956 A1    Nov. 27, 2003

Related U.S. Application Data

(60) Provisional application No. 60/239,970, filed on Oct. 13, 2000.

(51) Int. Cl.
*B01D 17/05* (2006.01)

(52) U.S. Cl. .......................... 210/708; 95/253; 95/254; 166/267; 210/709; 210/718; 210/724; 210/728; 210/729; 210/776; 210/804; 516/143; 516/145; 516/146

(58) Field of Classification Search .................. 95/8, 95/253, 254; 166/267, 357; 210/708, 709, 210/718, 724, 725, 727, 728, 729, 739, 776, 210/804, 806; 516/148, 161, 169, 179, 143, 516/145, 146

See application file for complete search history.

(56) References Cited

U.S. PATENT DOCUMENTS

| | | | | |
|---|---|---|---|---|
| 3,704,567 A | * | 12/1972 | Engal | .......................... 95/19 |
| 3,756,959 A | * | 9/1973 | Vitalis et al. | ................ 516/154 |
| 3,759,324 A | * | 9/1973 | Mecusker | ................ 166/75.12 |
| 4,424,068 A | | 1/1984 | McMillan | |
| 4,439,290 A | * | 3/1984 | Marfurt et al. | ............. 205/638 |

(Continued)

FOREIGN PATENT DOCUMENTS

WO    WO 92/19348    11/1992

*Primary Examiner*—Peter A. Hruskoci
(74) *Attorney, Agent, or Firm*—Victor H. Segura; Brigitte L. Echols

(57) ABSTRACT

Methods of treatment of fluids produced by an oil or gas well following a stimulation operation, allowing separation from the fluids and re-injection of oil and gas hydrocarbons in a production pipeline under pressure, and allowing achievement of suitable quality for the residual fluids compatible with their rejection, for example into the sea, including the following three elements; neutralization of the fluids by mixing with a high pH chemical, until the resulting pH reaches a level compatible with the equipment and pipes; use of optimized emulsion breakers in a phase separator, selected for best results with the fluids produced by the well, to accelerate the separation of oil from the fluids, and to lower the residual oil content in the fluids to levels compatible with environmental regulations; and use of a multiphase pump to pump the oil and gas hydrocarbons produced and reinject them in a pipeline under pressure.

23 Claims, 3 Drawing Sheets

U.S. PATENT DOCUMENTS

| | | |
|---|---|---|
| 4,547,149 A * | 10/1985 | Chaudot .................... 431/202 |
| 4,548,707 A | 10/1985 | Wolf et al. |
| 4,738,795 A | 4/1988 | Farnand |
| 5,302,294 A | 4/1994 | Schubert et al. |
| 5,375,618 A | 12/1994 | Giannesini |
| 5,711,338 A * | 1/1998 | Talon ............................ 137/8 |
| 5,857,522 A * | 1/1999 | Bradfield et al. ........... 166/267 |
| 5,965,029 A | 10/1999 | Simon et al. |
| 6,260,620 B1 * | 7/2001 | Furman et al. ............. 166/267 |
| 6,294,093 B1 * | 9/2001 | Selvarajan et al. ......... 201/708 |

* cited by examiner

METHOD FOR SEPARATING FLUIDS

This application claims benefit of Application No. 60/239,970, filed Oct. 13, 2000.

FIELD OF THE INVENTION

The present invention relates to the separation and testing of fluids obtained from underground formations. In particular, the invention provides new techniques for the separation of fluids from subterranean hydrocarbon wells, which are especially applicable in offshore situations.

BACKGROUND

The invention provides new solutions to address certain major environmental problems typically encountered in hydrocarbon exploration and production wells, especially in offshore operations. A common practice in certain regions (for example the Middle East) is to stimulate drain holes in carbonate reservoirs with hydrochloric acid, and then clean up the well before connecting it to the production line. One previous approach has been to direct clean up fluids through a burner until the pH falls to less than 6, burning all hydrocarbons produced and dumping the spent acid and contaminated mud in the sea Burning has an environmental and economical impact. The hydrocarbon burning produces toxic gases, soot, acid rain, unburned hydrocarbons and a large amount of $CO_2$, all of which are detrimental to the environment.

The direct economic impact is the cost of the oil and gas lost in flaring as well as the cost of burning equipment. This equipment has a large footprint (physical size), cost, power consumption and noise. Moreover, the risk of acid corrosion of pipelines under the sea is high. Any pipeline leak resulting from corrosion can potentially cause a shut down of production for several weeks as well as high repair costs and major pollution. Indirect costs linked to the large liability exposure due to the potential and actual damage to the environment are difficult to evaluate but could be several order of magnitude larger than direct costs.

In addition to acid and mud, well fluids, often containing oil at a concentration of about 3000 ppm, are also often dumped into the sea One aim of the present invention is to provide techniques to help reduce the oil content of water from a typical 3000 ppm to 10–80 ppm during a well test operation.

SUMMARY OF THE INVENTION

The invention provides methods of separating multiphase fluids produced from a well, comprising: feeding the multiphase fluids to a separator so as to form separate water and hydrocarbon phases; injecting at least part of the hydrocarbon phase into a production pipeline; and discharging the water phase.

Preferably, injection of the hydrocarbon phases into the production pipeline takes place via multiphase testing equipment and a multiphase pump.

Where the hydrocarbon phase comprises a gas phase and an oil phase, the method can include the step of separating the oil and gas phases, injecting the oil phase into the production pipeline and, optionally, burning the gas. Alternatively, the gas and oil phases are both injected into the production pipeline, in which case flaring of the gas phase can be avoided.

The method can also include the step of treating clean up fluids present in the fluids produced from the well and reducing the oil content in the water phase (e.g. to less than 80 ppm). The step of treating the clean up fluids can comprise neutralizing any acid in the fluids. Separation of the oil and water phases are effected using a skimmer and, optionally, selected chemicals to accelerate breaking of emulsions.

The invention provides a method of treatment of fluids produced by an oil or gas well following a stimulation operation, allowing separation from the fluids and re-injection of oil and gas hydrocarbons in a production pipeline under pressure, and allowing achievement of suitable quality for the residual fluids compatible with their rejection, for example into the sea, characterized by the combination of the following three elements:

1. Neutralization of the fluids by mixing with a high pH chemical, until the resulting pH reaches a level compatible with the equipment and pipes;
2. Use of optimized emulsion breakers in a phase separator, selected for best results with the fluids produced by the well, to accelerate the separation of oil from the fluids, and to lower the residual oil content in the fluids to levels compatible with environmental regulations; and
3. Use of a multi-phase pump to pump the oil and gas hydrocarbons produced and re-inject them in a pipeline under pressure.

This method can be further characterized by the use of a soda ash solution ($Na_2CO_3$) to neutralize the fluids produced by the well after a stimulation treatment using hydrochloric acid (HCl), and characterized by a pH of at least 5.5 for the neutralized fluids before injection in the separator equipment.

A blended surfactant demulsifier can be used to maximize the efficiency of the separation of oil from the fluids. The use of a non-toxic demulsifier for the separation of oil from the fluids is preferred.

DESCRIPTION OF THE PREFERRED EMBODIMENTS

I—Testing Pumps, Separator, Skimmer & Surge Tank

To achieve the aims of the invention, it is necessary to re-inject oil into the production line after spent acid is cleaned out. In order to achieve this, units for pumping live oil from the separator or surge tank are necessary to overcome the pressure in the production line especially at the start of the clean-up operation. It is also useful to have these pumps in order to achieve representative data during production well testing where it is required to have a relatively low separator pressure (to respect the choke performance/critical flow condition where downstream pressure should be 50% less than the upstream pressure).

Traditional three-phase separators work on the principle of gravity force settling and difference in gravity between the phases and the retention time of mixture. For oil and water production at 5000 bbls/day retention time in the separator is typically around 2 minutes, which can be less than the precipitation velocity of water droplets by gravity, which is calculated from the following formula:

$$V = \frac{D^2 \cdot (Sg_w - Sg_o) \cdot g}{18\mu}$$

Where:
V=Velocity
D=Droplet diameter
$Sg_w$=Water specific gravity
$Sg_o$=Oil specific gravity
$\mu$=Viscosity
g=gravity force This can result in discharging water with high oil content that could reach more than 2000 ppm, and water with the oil phase to production facilities. Water quality can be improved after separation by increasing retention or settling time, using settling equipment such as skimming units.

Figure 1:
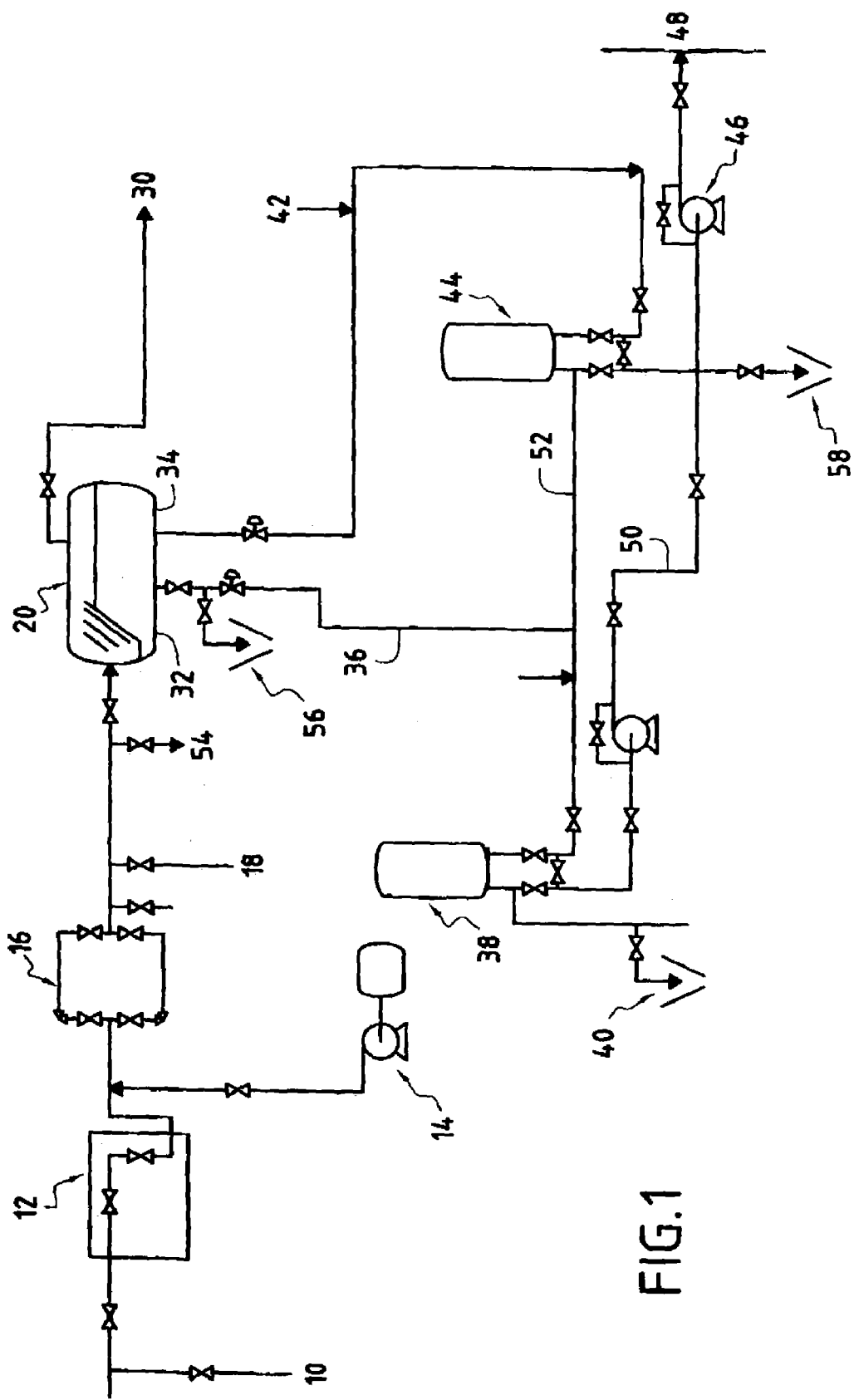
FIG. 1 shows a schematic of a system according to one embodiment of the invention.

FIG. 1 shows a schematic of a system according to the invention. Fluids (oil, water, gas) pass from the well head 10 to a separator 20 where the three phases separate, the gas being passed to a burner 30 and the oil and water settling in different parts of the separator 32, 34. The separation time and overflow into the oil compartment 34 (oil/water interface) are controlled by an automatic level control system; Water from the bottom of the separator which is still contaminated with oil is passed 36 to the skimmer 38 where further separation of oil and water takes place, the water at the bottom of the skimmer which has reduced oil contamination being dumped 40. Oil from the separator 20 which still has a significant amount of water mixed in is diverted 42 to a surge tank 44 (for example 80 bbl capacity) to allow further separation of dispersed water or water carryover. Oil from the surge tank 44 passes, via a pump 46, to the production line 48. The oil from the skimmer 38 is directed to the surge tank 44 for further separation and re-injection into the production line 48 while water from the bottom of the surge tank 44 is directed to the skimmer 38 for further separation and dumping 40. Thus the skimmer 38 and surge tank 40 together define a closed system and allow an improvement in the quality of water dumped, reduced toxic emissions and heat radiation and increased production/recovery.

Water is sampled at the separator inlet 54 and outlet 56 and from the bottom of the surge tank 58 and tested for pH frequently;

II—Chemical Treatment

A. Neutralization Process

To reduce the oil in water content, it is necessary to clean the clean up fluids from the first production. The acid in the clean up fluids is neutralized so that it can go through the separator from the start. For example, about ten gallons per foot of 15% HCL can be utilized to stimulate horizontal wells while higher volumes might be utilized for deviated oil and gas wells. Even after allowing the acid to soak into formation for 4 hours to allow proper contact, the pH of spent acid at surface is often in the range of 2 to 3. To overcome this problem, neutralization agents are used to raise the pH of the back flowed effluents to above 5.5. This is the acceptable limit to divert the effluents through the surface equipment and sea line. Soda ash solution ($Na_2CO_3$) is used for the following reasons:

produces soluble products in water;
is less toxic than other chemicals;
cost effective;
is usually available on the rig site.

Figure 2:
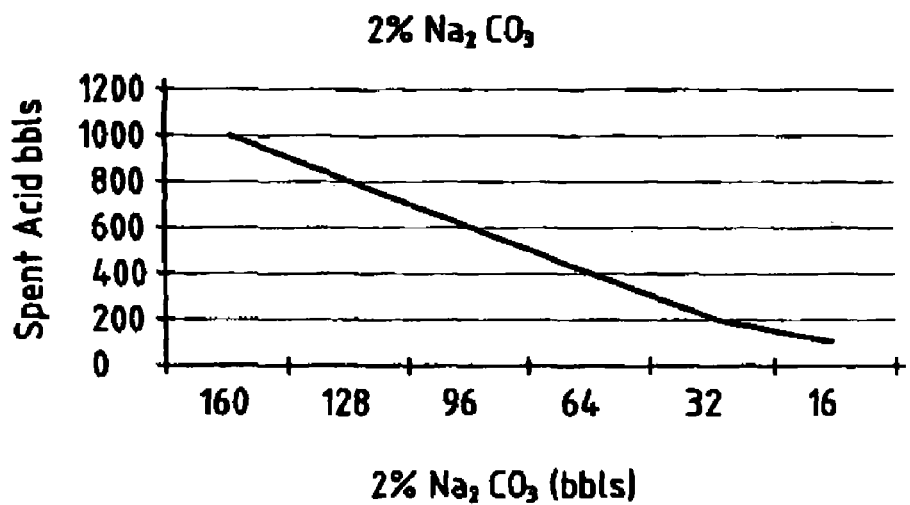
FIG. 2 shows a plot of soda ash volume vs. spent acid volume.

The graph in FIG. 2 shows the relation between $Na_2CO_3$ and the amount of acid injected.

B. Chemicals to Accelerate the Breaking of Emulsions

A blend of surfactants is used for the purpose of breaking emulsions present prior neutralizing the produced fluid to avoid toxicity problems. Tests have revealed the compatibility and efficacy of blended surfactants at very small dosages in comparison with individual chemicals. The utilization of blended surfactants allows the oil concentration in water to be dropped from 5% down to 0.5% of the returned fluid. Consequently, it is possible to maintain the chemical level discharged to the sea at the minimum.

Figure 3:
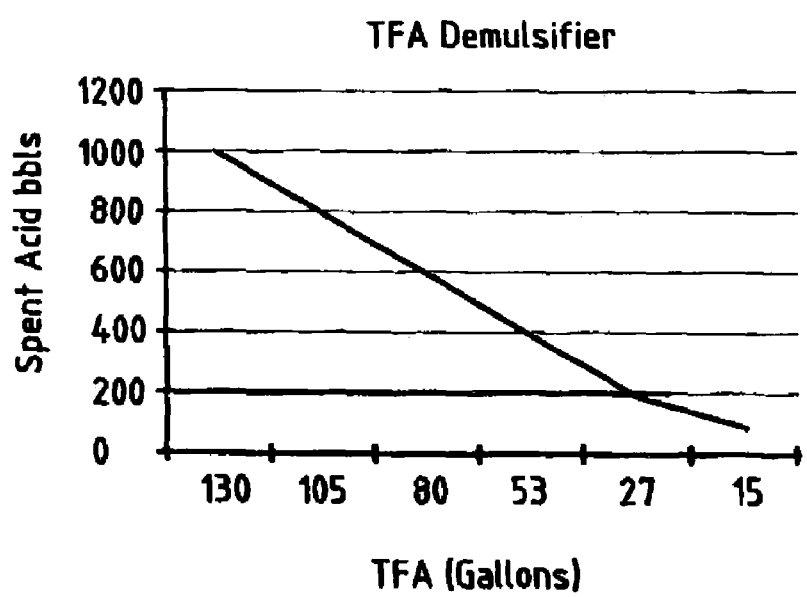
FIG. 3 shows a plot of surfactant blend vs. spent acid volume.

The graph in FIG. 3 shows the relation between the blended surfactant and the amount of acid injected.

Surfactant Blend I

The blended surfactant contains three different surfactants and it can be adjusted depending on the returned crude oil properties. The ratio adjustment of different components adds more flexibility for the blend.

| Surfactant Blend I | Composition |
| --- | --- |
| Methanol-based cationic and non-ionic surface active agents | 40% |
| Naphtha-based non-ionic surfactant | 30% |
| Water-based surfactant (a) | 30% |

Description of the Chemicals:

Methanol-based cationic and non-ionic surface active agents

This surfactant is strongly attracted to clay and silicate minerals. A film of surfactant is adsorbed onto the silicate surface leaving it preferentially oil wet. This reduces the tendency of clays to swell and become dispersed in the spent acid. The surface properties of the surfactant aid in removing clay particles from the interface between spent acid and oil. This helps prevent those emulsions that would normally be stabilized by clay dispersion.

| Information on ingredients: | quaternary amine compound | 15–40% |
| --- | --- | --- |
| | methanol | 30–60% |
| | aromatic alcohol glycol ether | 7–13% |
| | propan-2-ol | 3–7% |

Naphtha-Based Non-Ionic Surfactant

This surfactant is soluble in water and acid and is dispersible in oil. Used in acid, the surfactant remains soluble in the spent-acid solution, thereby enhancing clean up. The surfactant can also be used in a light oil displacement/flush to minimize emulsion blockage and assure rapid clean up, it is compatible with most anionic and cationic surfactants.

| Information on ingredients: | naphthalene | 5–10% |
| --- | --- | --- |
| | poly(oxy-1,2-ethanediyl)-nonylphenyl-hydroxy | 1–5% |
| | heavy aromatic naphtha | 60–100% |

Water-Based Surfactant (a)

This surfactant is a superior surface-active agent for use in hydrochloric acid (HCl) and mud acid, as well as brine and water-base fracturing fluids. It contains fluorinated hydrocarbons and reduces the surface tension of acid solutions to levels previously unattainable with conventional surfactants. This lowering of surface tension enables easier acid penetration into the reservoir porosity. The superior surfactant properties provide better clean up results.

| Information on ingredients: | propan-2-ol | 30–60% |
| --- | --- | --- |
| | aliphatic alcohol glycol ether | 10–30% |
| | methanol | 5% |
| | water | 30–60% |
| | oxyalkylated alkanols | 0–20% |
| | quaternary amine iodide derivative | 0–1% |
| | quaternary amine chloride derivative | 0.1–1% |

Surfactant Blend II

Depending on the quality of the oil, different blends of surfactants can be used. When there is a high sludging tendency, tests reveal that Surfactant Blend I might not be efficient. Surfactant Blend II can be used in these cases.

| Surfactant Blend II | Composition |
| --- | --- |
| Dodecylbenzene sulfonic acid-based non-ionic surfactant (a) | 30% |
| Naphtha-based non-ionic surfactant | 30% |
| Water-based surfactant (a) | 20% |
| Methanol-based cationic and non-ionic surface active agents | 20% |

Some crude oils react with acid to form a black asphaltic sludge. This sludge is formed by the coagulation of unstable colloidal material present in many crude oils. Sludge can stabilize emulsions, causing plugging of flow channels and pore spaces. It is sometimes responsible for the poor performance of acid treatments in some reservoirs. Dodecylbenzene sulfonic acid-based non-ionic surfactant is used in acid to alleviate crude oil sludging problems. It is also a good non-emulsifying agent and can often be used to prevent both sludge and emulsions from forming. It functions by stabilizing the colloidal material, preventing or inhibiting the contact of positive ions of acid, iron and calcium with the colloid.

| Information on Dodecylbenzene sulfonic acid-based non-ionic surfactant (a): | dodecylbenzene sulfonic acid | 54% |
| --- | --- | --- |
| | poly(oxy-1,2-ethanediyl)-nonylphenyl-hydroxy | 10–30% |
| | methanol | 24% |

Alternative Products for Use in Surfactant Blends:

Dodecylbenzene sulfonic acid-based non-ionic surfactant (b) (replacing Dodecylbenzene sulfonic acid-based non-ionic surfactant (a))

| Information on ingredients: | dodecylbenzene sulfonic acid | 30–60% |
| --- | --- | --- |
| | propan-2-ol | 10–30% |
| | glycol | 3–7% |
| | water | 1–5% |
| | glycol-ether | 7–13% |
| | glycol-ether | 10–30% |

Propan-2-ol-based surfactant (repacing naphtha-based non-ionic surfactant)

| Information on ingredients: | propan-2-ol | 15–40% |
| --- | --- | --- |
| | aromatic hydrocarbon | 5–10% |
| | oxyalkylated polyol | 10–30% |
| | alkyl ether phosphate ester | 5–10% |
| | oxyalkylated alkanols | 5–10% |
| | oxyalkylated alkanols | 5–10% |
| | resin A | 7–13% |
| | water | 7–13% |

Water-based surfactant (b) (replacing water-based surfactant (a))

| Information on ingredients: | polyglycol ether | 15–25% |
| --- | --- | --- |
| | polyglycol ether | 8–15% |
| | propan-2-ol | 15–25% |
| | 2-butoxyethanol | 17–25% |
| | water | 10–30% |

C. Process Description (See FIG. 1)

Clean up fluids, diesel spent acid, oil and gas flow through the flow line 10 to the eruption manifold 12 where the blended surfactant is injected upstream 14 of the choke manifold 16 to allow mixing of the fluid.

Downstream 18 of the choke manifold 16 a diluted solution of soda ash ($Na_2CO_3$) is injected to neutralize the spent acid before entering the three-phase test separator 20.

Oily water is then routed 36 to the skimmer 38 and oil is diverted 42 to the surge tank 44.

The fluid mixed with demulsifier is routed to the surge tank, which will increase the retention time to allow water to settle down and segregate.

Oil is re-injected to production line 48 after having the right pH value. Gas from separator, surge tank and skimmer is burnt 30.

III—Use of Multiphase Pumps

Gas flaring cm be eliminated by the utilization of multiphase pumps where the gas can flow together with the oil through the pump impeller without damaging it, thus allowing the re-injection of the gas.

In order to measure multiphase flow rates, a multiphase tester (for example, Schlumberger's PhaseTester Vx) is used, and to boost the pressure, a multiphase pump (such as those obtainable from Framo of Bergen, Norway) is used.

Figure 4:
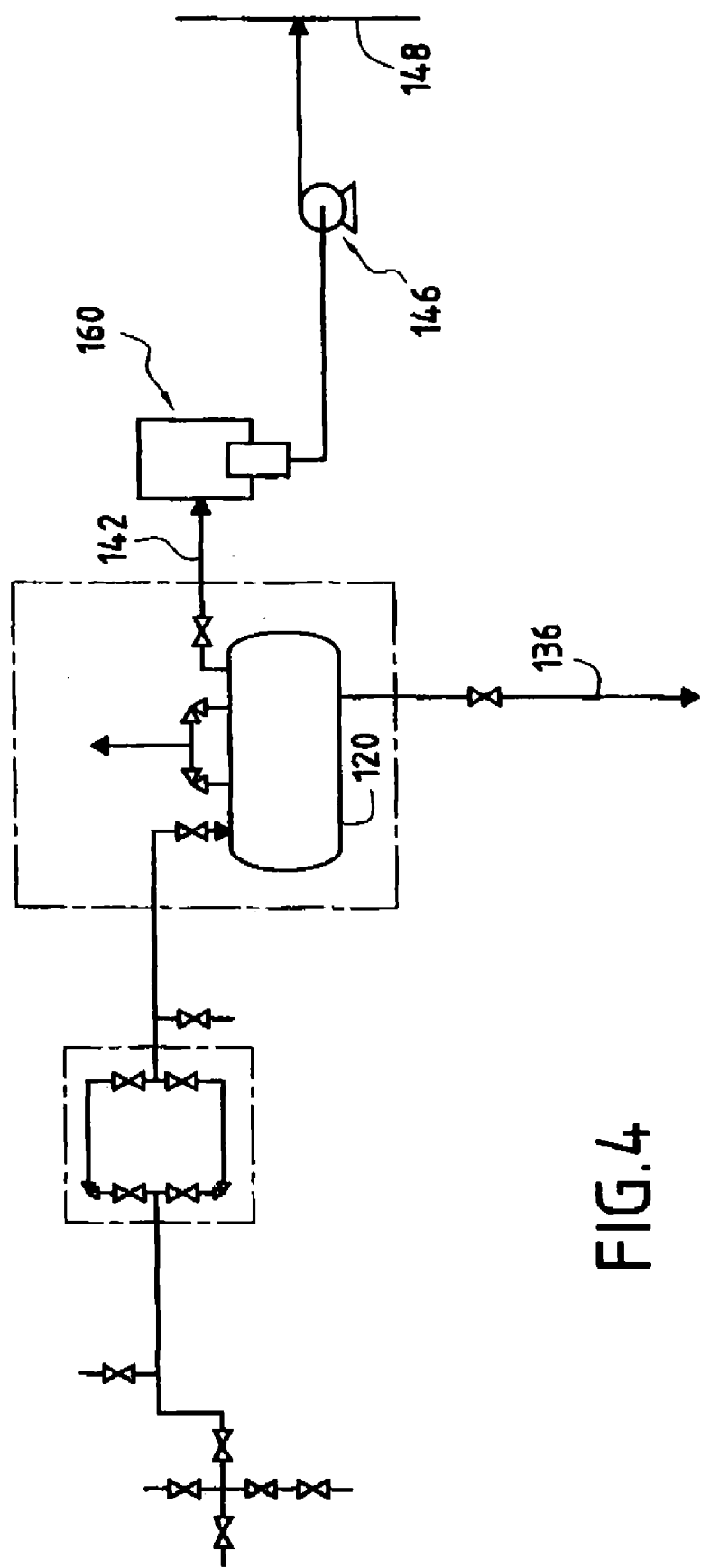
FIG. 4 shows a part schematic of a further embodiment of the invention.

The process is shown in FIG. 4. The input to the separator 120 is substantially as described above in relation to FIG. 1. However, in this case there are only two outlets. A first outlet 136 which outputs the water phase to a hydrocyclone or centrifuge oily water cleaning system (not shown). The oil outlet 142 passes oil and gas via a multiphase measuring system 160 and a multiphase pump 146 to the production flow line 148.

A system according to the invention can improve performance over prior art processes both from an ecological point of view and from technical and economical points of view. Field tests have yielded the following results:

Oil flaring reduced by 38% by after the one year and by 65% by the end of the two years, through the utilization of single-phase oil re-injection pumps.

Oil flaring reduced to 0% during the operations where pH neutralization systems are utilized.

Improved work environment for operating personnel because of reduced heat emissions and sea pollution.

Better reservoir characterization through the use of data with reduced time restriction on operations.

Improved cash flow: By these methods, hundreds of thousands of barrels of oil can be re-injected during one year and several hundred MMSCF of gas flared during the same year.

Protection of production pipelines from corrosion and prevention of leaks.

What is claimed is:

1. A method of separating multiphase fluids produced from a well, comprising:
   (i) feeding the multiphase fluids to a separator so as to form separate water and hydrocarbon phases wherein the hydrocarbon phase comprises an oil phase;
   (ii) passing the water phase to a skimmer in which any oil contained in the water phase is allowed to separate further;
   (iii) passing the oil phase to a surge tank in which any water contained in the oil is allowed to separate further;
   (iv) passing separated oil from the skimmer to the surge tank;
   (v) passing separated water from the surge tank to the skimmer;
   (vi) injecting oil from the surge tank into a production pipeline; and
   (vii) discharging water from the skimmer.

2. A method as claimed in claim 1, wherein injection of the oil into the production pipeline takes place via a multiphase pump.

3. A method as claimed in claim 1 wherein the hydrocarbon phase comprises a gas phase and an oil phase the method further comprising the steps of
   separating the oil and gas phases; and
   (ii) injecting the oil phase into the production pipeline.

4. A method as claimed in claim 3 further comprising burning the gas phase.

5. A method as claimed in claim 3, comprising injecting the gas and oil phases into the production pipeline.

6. A method as claimed in claim 1, further comprising treating the water phase to further reduce its oil content in the water phase.

7. A method as claimed in claim 6, comprising reducing the oil content in the water phase to less than 80 ppm.

8. A method as claimed in claim 6, further comprising using selected chemicals to accelerate breaking of emulsions.

9. A method as claimed in claim 8, wherein the chemicals comprise surfactants including methanol-based cationic and anionic surface active agents, naphtha-based non-ionic surfactants, water-based surfactants, dodecylbenzene sulfonic acid-based non-ionic surfactants, propan-2-ol based surfactants, or blends thereof.

10. A method as claimed in claim 9, wherein the methanol-based cationic and anionic surface active agents comprise:

| | |
|---|---|
| quaternary amine compounds | 15–40% |
| methanol | 30–60% |
| aromatic alcohol glycol ether | 7–13% |
| propan-2-ol | 3–7%. |

11. A method as claimed in claim 9, wherein the naphtha-based non-ionic surfactants comprise:

| | |
|---|---|
| naphthalene | 5–10% |
| poly(oxy-1,2-ethanediyl)-nonylphenyl-hydroxy | 1–5% |
| heavy aromatic naphtha | 60–100%. |

12. A method as claimed in claim 9, wherein the water based surfactants comprise:

| | |
|---|---|
| propan-2-ol | 30–60% |
| aliphatic alcohol glycol ether | 10–30% |
| methanol | 5% |
| water | 30–60% |
| oxyalkylated alkanols | 0–20% |
| quaternary amine iodide derivatives | 0–1% |
| quaternary amine chloride derivatives | 0.1–1%. |

13. A method as claimed in claim 9, wherein the dodecylbenzene sulfonic acid-based non-ionic surfactants comprise:

| | |
|---|---|
| dodecylbenzene sulfonic acid | 54% |
| poly(oxy-1,2-ethanediyl)-nonylphenyl-hydroxy | 10–30% |
| methanol | 24%. |

14. A method as claimed in claim 9, wherein the dodecylbenzene sulfonic acid-based non-ionic surfactants comprise:

| | |
|---|---|
| dodecylbenzene sulfonic acid | 30–60%% |
| propan-2-ol | 10–30% |
| glycol | 3–7% |
| water | 1–5% |
| 1$^{st}$ glycol-ether | 7–13% |
| 2$^{nd}$ glycol-ether | 10–30%. |

15. A method as claimed in claim 9, wherein the propan-2-ol based surfactant comprises:

| | |
|---|---|
| propan-2-ol | 15–40% |
| aromatic hydrocarbon | 5–10% |
| oxyalkylated polyol | 10–30% |
| alkyl ether phosphate ester | 5–10% |
| 1$^{st}$ oxyalkylated alkanols | 5–10% |
| 2$^{nd}$ oxyalkylated alkanols | 5–10% |
| resin | 7–13% |
| water | 7–13%. |

16. A method as claimed in claim 9, wherein the water-based surfactants comprise:

| | |
|---|---|
| 1st polyglycol ether | 15–25% |
| 2nd polyglycol ether | 10–30% |
| propan-2-ol | 15–25% |
| 2-butoxyethanol | 17–25% |
| water | 10–30%. |

17. A method as claimed in claim 9, wherein the surfactant blend comprises:

| | |
|---|---|
| methanol-based cationic and anionic surface active agents | 40% |
| naphtha-based non-ionic surfactants | 30% |
| water-based surfactants | 30%. |

18. A method as claimed in claim 9, wherein the surfactant blend comprises:

| | |
|---|---|
| naphtha-based non-ionic surfactants | 30% |
| dodecylbenzene sulfonic acid-based non-ionic surfactants | 30% |
| water-based surfactants | 20%. |

19. A method as claimed in claim 1, further comprising treating the multiphase fluids produced from the well.

20. A method as claimed in claim 19, wherein the step of treating the multiphase fluids comprise neutralizing any acid in the fluids.

21. A method as claimed in claim 20, comprising neutralizing acid using a solution of $Na_2CO_3$.

22. A method as claimed in claim 21, wherein the solution is injected into the fluids prior to their passing to a separator.

23. A method as claimed in claim 22, comprising raising the pH of the fluids to at least 5.5 prior to injection into the separator.

* * * * *